Dec. 29, 1936. W. C. BAXTER 2,065,550

FOOD PRODUCT AND METHOD OF MAKING SAME

Filed July 24, 1936

INVENTOR
William C. Baxter,
BY
ATTORNEY

Patented Dec. 29, 1936

2,065,550

UNITED STATES PATENT OFFICE 2,065,550

FOOD PRODUCT AND METHOD OF MAKING SAME

William C. Baxter, Newtown, Conn.

Application July 24, 1936, Serial No. 92,318

4 Claims. (Cl. 99—137)

The subject of this invention is a new food product, and the method of making same; such food product, more particularly, having ice cream as one chief component, and a collection of strands, shreds or pieces of toasted or otherwise cooked and crunchy cereal as the other chief component.

I have discovered that the gustatory appeal of ice cream of practically any flavor is greatly increased when a cereal is mixed or intermingled therewith, especially if a cereal be selected which has what may be termed a nutty or toasted flavor when in fairly crisp condition. Most satisfactory results have so far been obtained when the cereal is wheat, shredded or stranded or otherwise broken up, and then assembled into a suitable collection and toasted, to form a biscuit of the kind commercially sold under the name of "shredded wheat" biscuit. I refer to a nutty or toasted flavor for the cereal, for the reason that, in practicing the invention especially with shredded wheat biscuit, a mixture of intermingled ice cream and cereal pieces, strands or shreds has at once the characteristic flavor of the ice cream and also a pleasingly new flavor suggestive of a familiar yet an unfamiliar nut content—this last derived from such cereal pieces.

When the cereal pieces are parts of a shredded wheat biscuit or the like the new food product is really delectable only when the cereal pieces, when taken into the mouth with an intermingled mass of ice cream, are in fairly crisp condition, by which I mean a condition such that these cereal pieces are not yet soggy, although somewhat moist along and immediately below their superficies.

In the ordinary eating of shredded wheat biscuit with milk or cream, if a thin milk is used and the biscuit is allowed to soak even for a comparatively short time in a pool of such milk, the disk is an unappetizing and highly unsatisfactory one, except to those who for lack of teeth or otherwise enjoy mush, whereas, if the lacteal fluid employed is a heavy or medium cream and if the biscuit and such fluid are together consumed even by a very slow eater, the pieces of the biscuits spooned off or otherwise segregated for each bite carry suitable portions of the lacteal fluid on their surfaces and within their interstices and yet there is a certain definite and desirable crisp-chewability retained by said pieces.

The attainment of this crisp-chewability of the cereal components of a mixture of a cereal in shredded or other broken up form, and an ice cream, is a principal object of the invention. If such crisp-chewability, hereinafter for convenience termed crunchiness, is not obtained, the mixture will taste more like the result of such a sad domestic accident as the inadvertent and unnoticed addition of cold porridge to an ice cream mix before freezing of the latter, than anything else, and thus in most cases be nothing more nor less than an unsavory mess.

As just above stated, a cardinal aim of the invention is to attain a sufficiently prolonged maintenance of crunchability of the cereal pieces,—these last for convenience hereinafter called the wheat shreds, and then reference being made, according to present preference, to one or more connected or disconnected shreds resulting from breaking up of a shredded wheat biscuit,—in a mixture of wheat shreds and ice cream. By a mixture is not meant merely an underlying stratum made up of wheat shreds and an overlying stratum made up of ice cream, or vice versa; but a real mixture in the sense that the ice cream, in a somewhat fluent condition, is entered well into the interstices between a congeries of more or less connected or intermingled wheat shreds or a collection or a plurality of closely assembled wheat shreds.

The explanations and definitions above having been given, and making the further comment that, also for convenience, a shredded wheat biscuit will be hereinafter referred to as representative of any suitable equivalent or substitute, an outline of the problems which had to be overcome and a statement of the essence of the invention may now be given rather briefly.

In the first place, it was found that the ice cream, most probably, should always be placed atop an upper surface of a shredded wheat biscuit, so that, during the period of initial consumption of the dish at least, the first cutting or separating effect of the spoon or fork will be relative to the ice cream and not to the biscuit. This presented a problem.

The ice cream when thus applied to a biscuit cannot be frozen so hard that attempts to cut the ice cream by spoon or fork would tend to crush an underlying biscuit portion. On the other hand, if the ice cream when placed on top of the biscuit is "soft", that is, is of a relative warmth and fluidity such that between the time of depositing the same on a dry biscuit and the time of commencing to eat the biscuit the ice cream will flow sufficiently down into the interstices between the shreds to permit an intermingled mass of ice cream and wheat shreds to be forked or spooned, the biscuit would become softened to unpalatable sogginess long before the entire dish was consumed, since the lacteal component of most ice cream is milk rather than cream. Therefore, the choice narrowed down to the use of ice cream of a consistency approximately like that maintained for ice cream when packed in containers as customarily used in the ordinary soda fountain or confection shop. In these places, the stocked ice cream in said containers, usually metal ones of several gallons capacity, is maintained in what may be called a highly plastic but non-liquid condition, such that service portions of ice cream can be readily and easily scooped from a container for patting into take-away cardboard containers and for the making of ice cream sodas, ice cream cones, ice cream sandwiches and other specialties of these kinds. Ice cream of the consistency just described will hereinafter be referred to as ice cream of a practicable consistency.

Ice cream of a practicable consistency, however, when placed on top of a shredded wheat biscuit, or, indeed, when placed underneath or alongside a shredded wheat biscuit, was found to melt first at the air-contacting surfaces of the mound or layer of ice cream long before melting at the surface or surfaces of such mound or layer laid against the shredded wheat biscuit. In other words, there was no penetration, or not sufficiently rapid penetration (relative to the period of time measured between the making up of the new product on special order and the placing of same before the customer for consumption at the table or counter, and the fairly immediately ensuing time when the customer wishes to commence such consumption), of the ice cream into the interior of the biscuit.

This difficulty I discovered I could solve by preliminarily treating the biscuit with a liquid, and this, as was essential, without deleteriously affecting the cruchiness of the wheat shreds.

This preliminary treatment of the biscuit is the application thereto of cream.

Referring now to the accompanying drawing, illustrating now preferred products and methods according to the invention:

Figure 1 is a perspective view of an ordinary shredded wheat biscuit.

Fig. 2, illustrating the completion of that step in my method following which a suitable cream has been caused to penetrate at least partially into the interior of the biscuit, is a somewhat diagrammatic or a quasi-elevational view of said biscuit (looking at the same from one side thereof) in that no attempt has been made to show the various shreds but merely the general outline of the biscuit when seen in side elevation.

Figure 1:
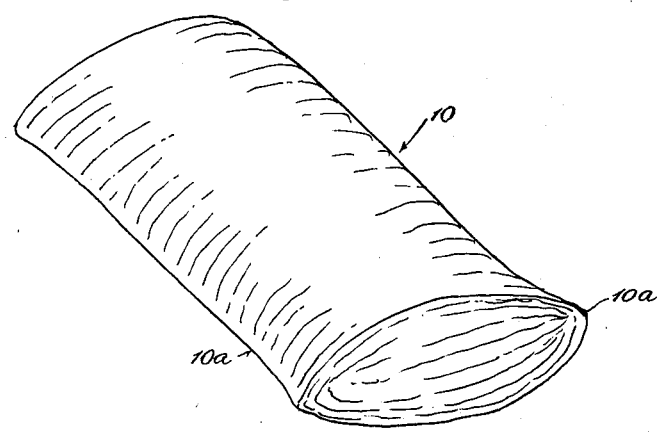
Figure 2:
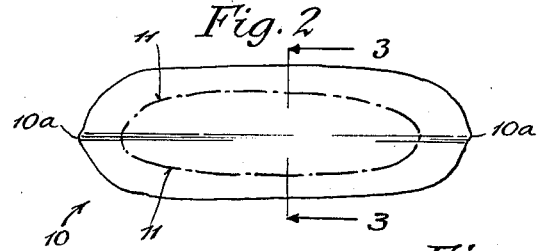
Figure 3:
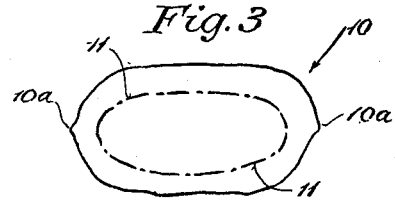
Fig. 3 is a view similar to Fig. 2, and illustrating the same stage in the method as in Fig. 1, but looking at the biscuit from one end thereof.
Figure 4:
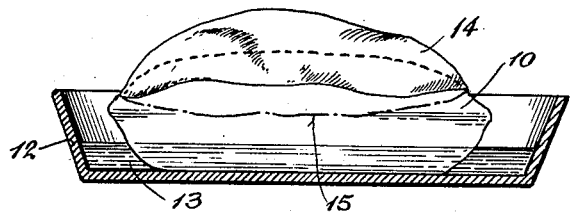
Fig. 4 is a side elevational view of the biscuit by a depiction thereof similar to that of Fig. 2, but with the biscuit in a pool of cream in a dish (such dish shown in vertical section) and with the biscuit underlying a mound of ice cream which has become so softened at its bottom as to have partially penetrated down into the interior of the biscuit.

Referring to this drawing in detail, in Figs. 1, 2, 3 and 4, the biscuit shown is indicated at 10. As is well known, such biscuit is pillow-shaped, and made of a mass of more or less parallel shreds of toasted wheat (not illustrated in these views, as aforesaid) crimped together and cohered at the opposite sides of the biscuit to form longitudinal terminal horizontal ribs 10a.

Such a biscuit, when treated with cream as below exlained, is given a cream penetration to a suitable extent, as, for instance, to the extent indicated by the dot-and-dash lines 11.

Such cream, I have found, can be applied in any of the ways usual in connection with the ordinary eating of a shredded wheat biscuit as a breakfast cereal served with a lacteal fluid; for instance, by subjecting the biscuit to a dipping in a pool of cream and maintaining the biscuit thus dipped along enough to have the cream enter the interior of the biscuit a quarter-inch or more below the surface thereof, and then placing the biscuit on a serving dish,—or by placing the biscuit in a shallow bowl and pouring over it a sufficient amount of cream to allow capillary attraction to draw the cream into the interior of the biscuit to approximately the extent last mentioned,—or by placing in such bowl an ordinary serving of cream and laying the biscuit on the surface of the pool of cream confined in the dish. In both of the last-mentioned cases, the biscuit is desirably turned upside-down as soon as the side thereof which first melts the cream has been in contact with the cream a long enough time, an interval usually measured in seconds, to have caused the interior of the biscuit adjacent to said side to become penetrated by the cream to the extent above stated. I have found that satisfactory results are obtained by medium cream, that is, a lacteal fluid thicker than ordinary skimmed milk as commercially sold as such, but not necessarily as thick as very rich and heavy cream.

Then the thus treated biscuit, conveniently placed in a dish 12 or within or on some other suitable support, and set if desired in a pool of cream as indicated at 13, is partially or wholly covered as shown with a scoop or scoops, or an otherwise conveniently applied mass or mound or layer of, ice cream 14, of the practicable consistency aforesaid.

After giving such a preliminary creaming treatment to the shredded biscuit, and after placing a mound or layer of ice cream of practicable consistency, that is, of a "softness" or viscosity or plasticity far beyond that of so-called "soupy" ice cream, the ice cream mound or layer almost at once begins to soften at its bottom and work its way down into the underlying biscuit material, and without mushifying or soggifying the latter. By the time the thus finished product has been completed and placed before the customer and he is ready to apply his spoon or fork to the product, the lower portion of the ice cream mound 14 has softened, and then or very soon thereafter the ice cream has penetrated down into the interstices between, and become thoroughly intermingled with, the wheat shreds, as more or less diagrammatically indicated by the dot-and-dash line 15. As the consumption of the product proceeds, this penetration and intermingling continues more and more, even down to the then prevailing surface level of the pool 13, or until the bottom shreds are parts of intermingled ice cream and biscuit, and all without the wheat shreds ever losing their crunchiness.

I hazard the following explanation, although of course I am not bound to give the correct explanation: Any body having a large number of air-confining interstices is a heat-insulator; for example, rock wool as used for structural airconditioning in architecture. A shredded wheat biscuit is such a body. The cream in which such biscuit is preliminarily treated according to the present invention "short-circuits" the heat-insulative action of the biscuit; that is, the interstices in the biscuit become filled with cream, which is a good heat conductor, and a far better heat conductor than the air surrounding the top and sides of the mound of ice cream atop the biscuit, because the entry of the cream into said interstices, by capillary attraction, displaces the heat-insulative air normally filling said interstices.

Variations and modifications may be made within the scope of this invention, and portions of the improvements may be used without others.

I claim:

1. A food product including the combination of a collection of strand-like crunchy cereal pieces in such intermingled condition as ordinarily to provide heat-insulating air-containing interstices therebetween; a collection of ice cream frozen to a practicable consistency; and a lacteal fluid applied at a selected surface of said cereal collection to cause substitution of such liquid for air in certain of said interstices, the ice cream being applied against said selected surface but after application of said lacteal fluid to said surface.

2. A food product including the combination of a foundation the chief component of which is a collection of strand-like crunchy cereal pieces in such intermingled condition as ordinarily to provide heat-insulating air-containing interstices therebetween and another component of which is a liquid added to said collection at the upper portion thereof to substitute such liquid for air in certain of said interstices; and a superstructure immediately on said foundation and the chief component of which is ice cream frozen to a practicable consistency, whereby during consumption of the product the ice cream is caused to soften and descend and penetrate into the interstices between said cereal pieces and intermingle thoroughly therewith while allowing the pieces last-mentioned to maintain their crunchiness.

3. The method of making a food product including as its dominant constituents a collection of strand-like crunchy cereal pieces in intermingled and connected condition to provide a single structural entity able to be handled as such, and ice cream, and of making said food product so that the ice cream will become intermingled with said cereal pieces while allowing said pieces to maintain their crunchiness during consumption of the product; which method involves applying a lacteal fluid to said unit at a selected surface thereof until such fluid has penetrated below said surface to a prevised depth, and placing against said surface a mass of ice cream frozen to a practicable consistency.

4. The method of making a food product including as its dominant constituents a collection of strand-like crunchy cereal pieces in intermingled and connected condition to provide a single structural entity able to be handled as such, and ice cream, and of making said food product so that the ice cream will become intermingled with said cereal pieces while allowing said pieces to maintain their crunchiness during consumption of the product; which method involves applying a lacteal fluid to said unit at a selected surface thereof until such fluid has penetrated below said surface to a prevised depth, arranging said entity with said surface uppermost and applying over said surface a collection of ice cream frozen to a practicable consistency.

WILLIAM C. BAXTER.